US00RE43887E

(19) United States
(12) Reissued Patent
Langsdorf et al.

(10) Patent Number: US RE43,887 E
(45) Date of Reissued Patent: Jan. 1, 2013

(54) CONVEYOR CAROUSEL WITH DISTRIBUTED DRIVE SYSTEM

(75) Inventors: John L. Langsdorf, Bedford, TX (US); Gojko Valencic, Colleyville, TX (US)

(73) Assignee: Siemens Industry, Inc., Alpharetta, GA (US)

(21) Appl. No.: 13/303,458

(22) Filed: Nov. 23, 2011

Related U.S. Patent Documents

Reissue of:
(64) Patent No.: 7,621,392
Issued: Nov. 24, 2009
Appl. No.: 12/128,868
Filed: May 29, 2008

U.S. Applications:
(60) Provisional application No. 60/932,126, filed on May 29, 2007.

(51) Int. Cl.
*B65G 23/00* (2006.01)

(52) U.S. Cl. ..... 198/832; 198/794; 198/832.1; 198/502.1

(58) Field of Classification Search ..... 198/832, 198/794, 832.1, 502.1, 804, 465.3, 833, 834, 198/321, 831
See application file for complete search history.

(56) References Cited

U.S. PATENT DOCUMENTS

| | | | | |
|---|---|---|---|---|
| 3,361,249 | A | 1/1968 | Cadman et al. | |
| 3,399,758 | A | 9/1968 | Karr | |
| 3,416,645 | A | 12/1968 | Jones | |
| 3,718,249 | A | 2/1973 | Hess | |
| 3,777,877 | A * | 12/1973 | Piper | 198/833 |
| 3,854,574 | A | 12/1974 | Theijsmeijer et al. | |
| 3,881,592 | A | 5/1975 | Stimpson | |
| 4,476,974 | A | 10/1984 | Bradbury | |
| 4,650,066 | A | 3/1987 | Bradbury | |
| 5,090,863 | A | 2/1992 | Lichti et al. | |
| 5,201,407 | A | 4/1993 | Proske | |
| 5,427,227 | A | 6/1995 | Crandall et al. | |
| 6,186,314 | B1 | 2/2001 | Conklin, Jr. | |
| 6,279,732 | B1 | 8/2001 | Thompson | |
| 6,315,101 | B1 | 11/2001 | Hugon | |
| 6,334,526 | B1 | 1/2002 | Hatton | |
| 6,758,327 | B1 | 7/2004 | Stebnicki et al. | |

FOREIGN PATENT DOCUMENTS

| | | | |
|---|---|---|---|
| FR | 2583024 | A1 | 12/1986 |
| JP | 54129669 | A | 10/1979 |
| JP | 54151285 | A | 11/1979 |
| JP | 54159980 | A | 12/1979 |
| JP | 55052805 | A | 4/1980 |
| JP | 55115511 | A | 9/1980 |
| JP | 55130403 | A | 10/1980 |
| JP | 55140407 | A | 11/1980 |
| JP | 2000302225 | A | 10/2000 |
| WO | WO 01/09012 | A1 | 2/2001 |

* cited by examiner

*Primary Examiner* — James R Bidwell

(57) ABSTRACT

A carousel according to the invention uses a number of smaller, less expensive drive units at different locations along the carousel path in place of a single larger drive unit of comparable capacity. Closed loop control according to the invention allows individual drives to be de-energized when the power requirements do not demand their usage. When not energized, the drives may be disengaged from the chain, such as by way of a linear actuator as described hereafter. Benefits of such a system include reduced mechanical costs, longer drive life, better redundancy/higher availability, correct drive power, lower energy use, closed loop system monitoring and reduced collateral damage.

18 Claims, 8 Drawing Sheets

CONVEYOR CAROUSEL WITH DISTRIBUTED DRIVE SYSTEM

Matter enclosed in heavy brackets [ ] appears in the original patent but forms no part of this reissue specification; matter printed in italics indicates the additions made by reissue.

This application *is a reissue of U.S. patent application Ser. No. 12/128,868, filed May 29, 2008, now U.S. Pat. No. 7,621,392, which* claims priority of U.S. Provisional Ser. No. 60/932,126, filed May 29, 2007.

FIELD OF THE INVENTION

The present application relates to closed-loop conveyors, particularly to those suitable for conveying baggage in an airport environment.

BACKGROUND OF THE INVENTION

Airports presently use carousel style conveyors for both baggage claim and sortation operations. A series of overlapping plates or pallets overlie the chain and are supported by it for movement along the top of a supporting frame. See for example U.S. Pat. Nos. 4,650,066 and 4,476,974. Sortation (make-up, racetrack) carousel operations are different from claim (baggage reclaim carousel) operations. Sortation carousels often operate 18 to 20 hours per day. Claim carousels only operate intermittently, during baggage reclaim operations, until a predetermined time-out is reached. Known designs for such carousels typically rely on a single large drive unit that engages a drive chain. Multiple drives for a single conveyor have been deployed when additional power was needed due to the length of the carousel path and/or the expected weight of objects transported. However, in such known systems, no attempt has been made to control the multiple drive units in something other than by means of basic on/off pushbutton controls.

Carousel conveyors currently in use are generally reliable but require large expensive drive systems that waste energy and result in downtime when there is a problem with the drive assembly that requires repair or maintenance. Based on current standards for carousel drive design, the redundancy requirements (that insure system availability) result in excessive HP capacity and energy consumption. A need persists for a carousel conveyor suitable for airport [sues] *uses* that has a longer life, consumes less energy, and can be controlled in a manner that responds to the load, rather than in a simple on-off mode. The present invention addresses these needs.

SUMMARY OF THE INVENTION

A carousel conveyor system according to the invention includes an endless conveyor support frame including one or more endless support rails disposed along a generally elliptical carousel path. A friction drive chain is disposed on the conveyor support frame for movement along the carousel path. A pallet assembly including a series of overlapped pallets is configured to fit over an upper surface of the conveyor support frame. The pallet assembly includes a pallet support assembly with wheels that support the pallets on the rails of the conveyor support frame; and connectors securing the pallet assembly to the drive chain for movement in unison therewith. At least two friction drive units each include an electric motor, and electrical disconnects are provided for connecting and [disconnect] *disconnecting* each motor from a source of electrical power. A friction drive wheel is positioned for driving contact with the drive chain. The [rive] *drive* units are located at spaced apart positions on the conveyor support frame along the carousel path.

A controller is programmed with control logic for operation of the drive units and connected to receive signals that indicate electrical load on the motor of that drive unit during carousel operation and also connected to the disconnects in a manner that is effective to turn the associated motor on or off in response to a signal from the controller, wherein the control logic takes an action in response to feedback comprising the signals from each drive unit that indicate electrical current being drawn by the motors. These and other aspects of the invention are discussed further in the detailed description that follows.

BRIEF DESCRIPTION OF THE DRAWINGS

In the accompanying drawings, wherein like numerals denote like elements.

DETAILED DESCRIPTION

Figure 1:
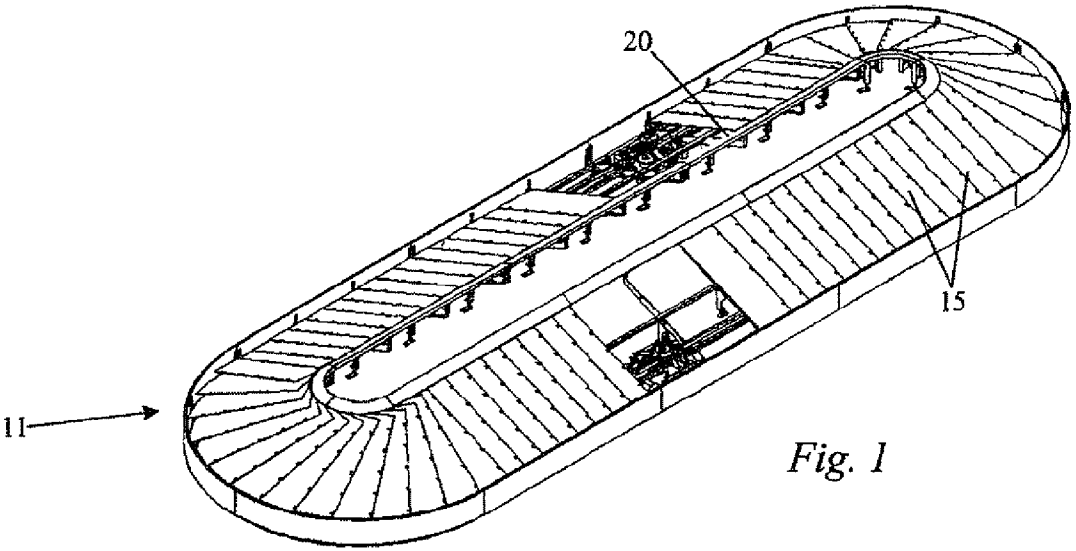
FIG. 1 is a perspective view of a carousel according to the invention.

A carousel according to the invention uses a number of smaller, less expensive drive units at different locations along the carousel path in place of a single larger drive unit of comparable capacity. Closed loop control according to the invention allows individual drives to be de-energized when the power requirements do not demand their usage. When not energized, the drives may be disengaged from the chain, such as by means of a linear actuator as described hereafter. Benefits of such a system include reduced mechanical costs, longer drive life, better redundancy/higher availability, correct drive power, lower energy use, closed loop system monitoring and reduced collateral damage.

For purposes of the invention "closed loop control" refers to use of a programmable logic controller, computer or similar control device that directly or indirectly receives a signal that indicates directly or indirectly the electrical load on the motor of each drive unit at that moment, for example, a signal from each drive motor that indicates the electrical current draw by that motor. The controller operates the motors in accordance with a programmed control scheme prescribed by the system operator or designer. It may be desired, for example, to routinely keep one or more drive motors disengaged because the remaining motors are able to meet the needs of the carousel. This can be determined based on the operating current load indicated for each drive motor. Under light load conditions, for example, the feedback from each drive motor indicates for example that only 2 of the 4 motors provided are sufficient to operate the system. The controller then selects and disengages two motors. During the period of operation that follows, the controller continues to receive feedback signals from each motor. In the event that the weight on the carousel increases and the electrical load on one or both of the two motors then in operation exceeds a predetermined threshold, then the controller activates one of the inactive motors so that the current load on all three of the active motors is at an acceptable level.

This is a simple example of closed loop control according to the invention, wherein the control loop is established between the motors and the controller and changes in the condition of the motor(s) are monitored (preferably, continuously) and result in command signals from the controller that make adjustments to increase or decrease the level of operation of one or more of the motors (or take a motor out of service) in a manner that responds to the measured load on the motors and the programming of the controller. Other control schemes may also be implemented wherein the action taken does not depend directly on load signal measurements at that moment, unless abnormal. The controller may, for example, be programmed to take motors out of service according to a sequence in order to balance out the useful lives of the motors. While preprogrammed control schemes can be used, it is preferred that a master control panel with a suitable user interface such as a touch screen with buttons and menus be provided allowing a user to program operation of the carousel system as needed and monitor the current state of the system, e.g. see the motors available, running, current levels, operating modes and other information as requested such as total run hours for each motor.

Figure 2:
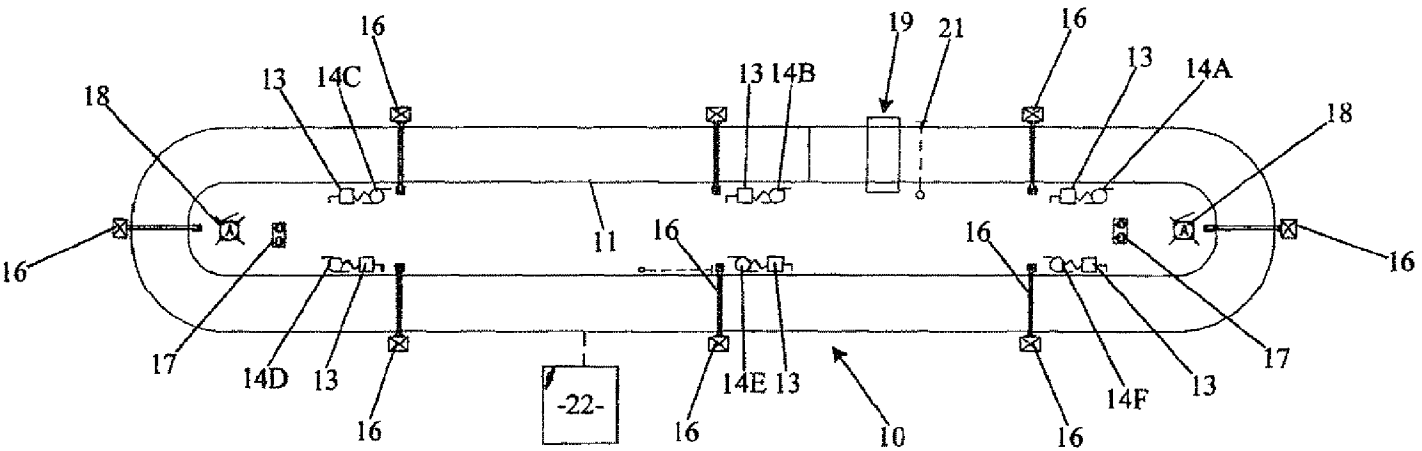
FIG. 2 is a schematic top view the carousel of FIG. 1.
Figure 3:
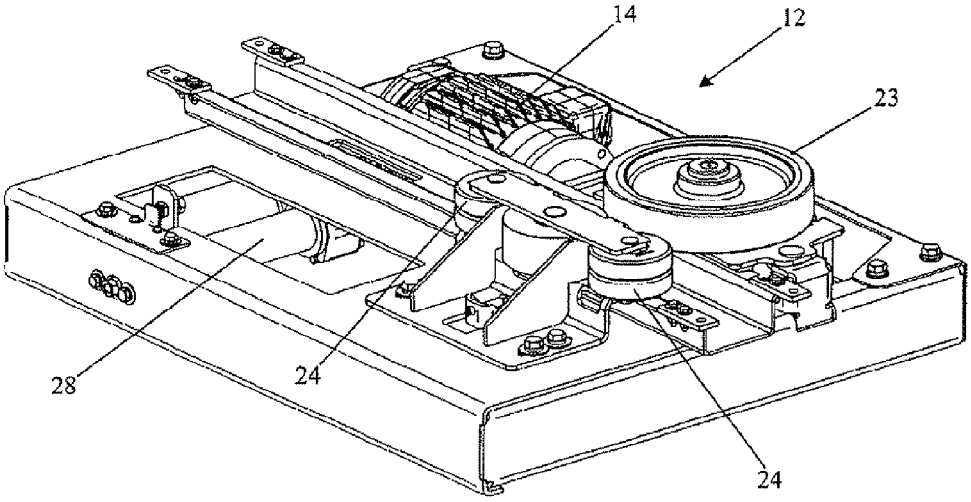
FIG. 3 is a perspective view of a drive unit according to the invention.
Figure 4:
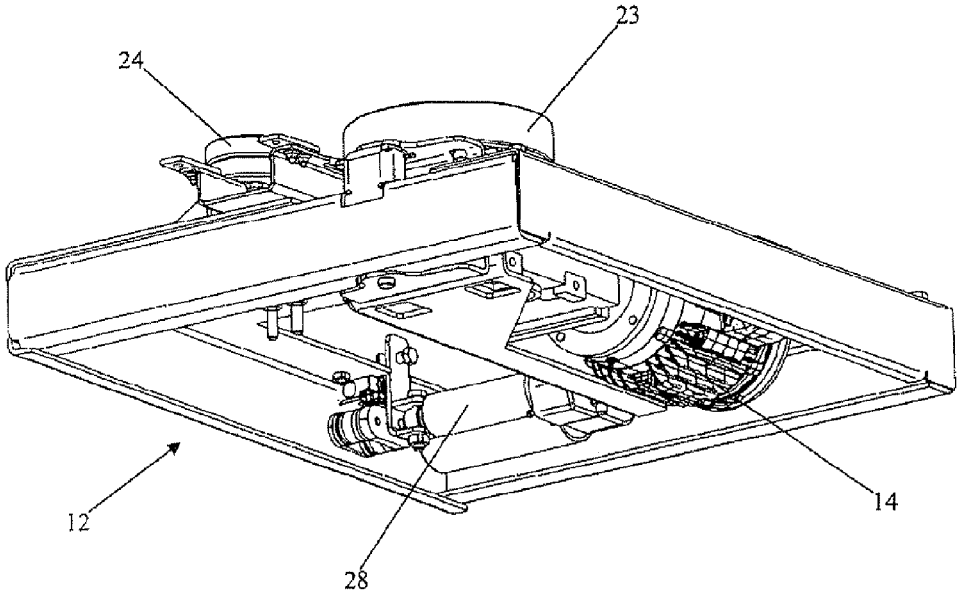
FIG. 4 is an underside perspective view of the drive unit of FIG. 3.
Figure 5:
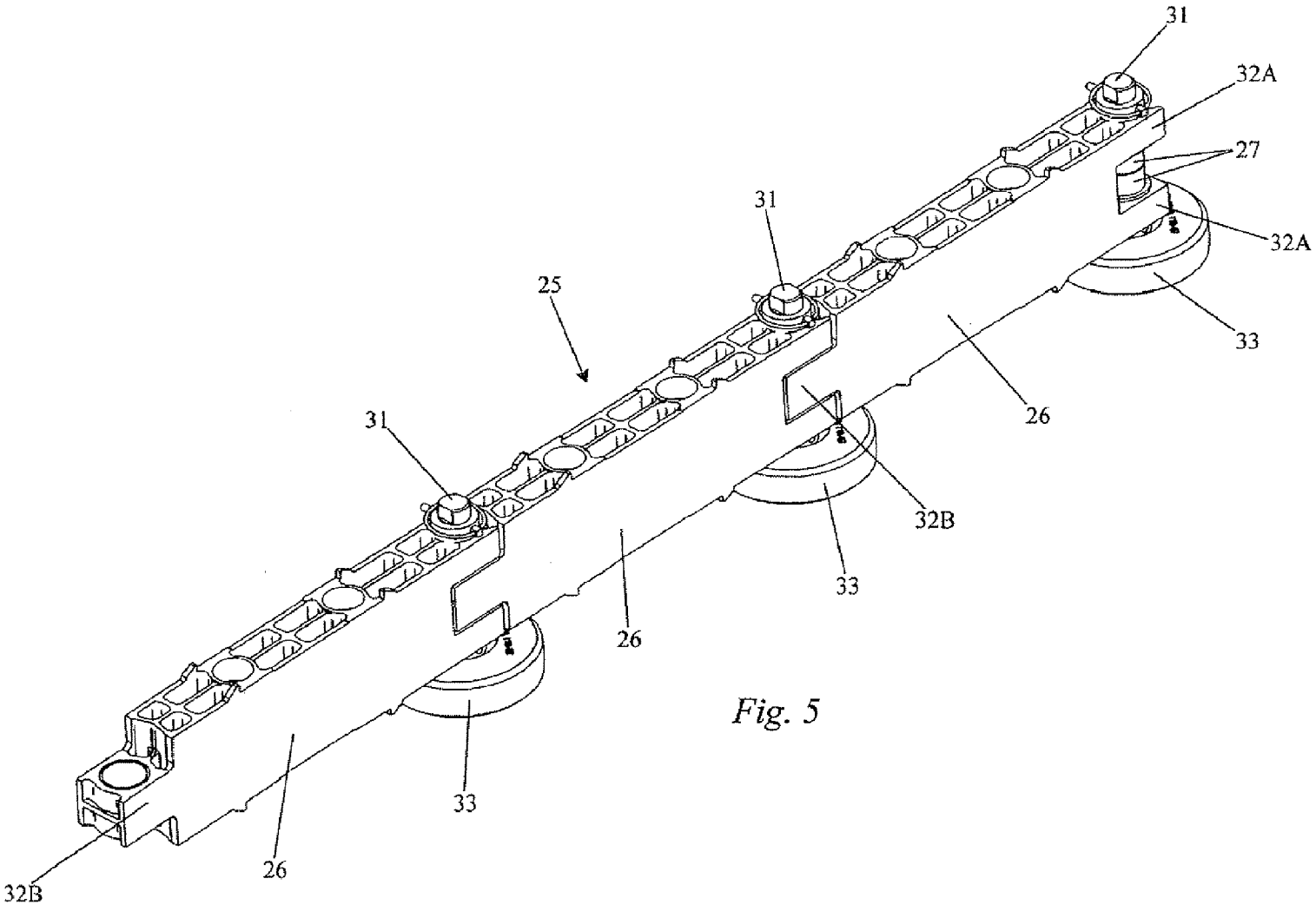
FIG. 5 is a perspective view of a drive chain according to the invention.
Figure 6:
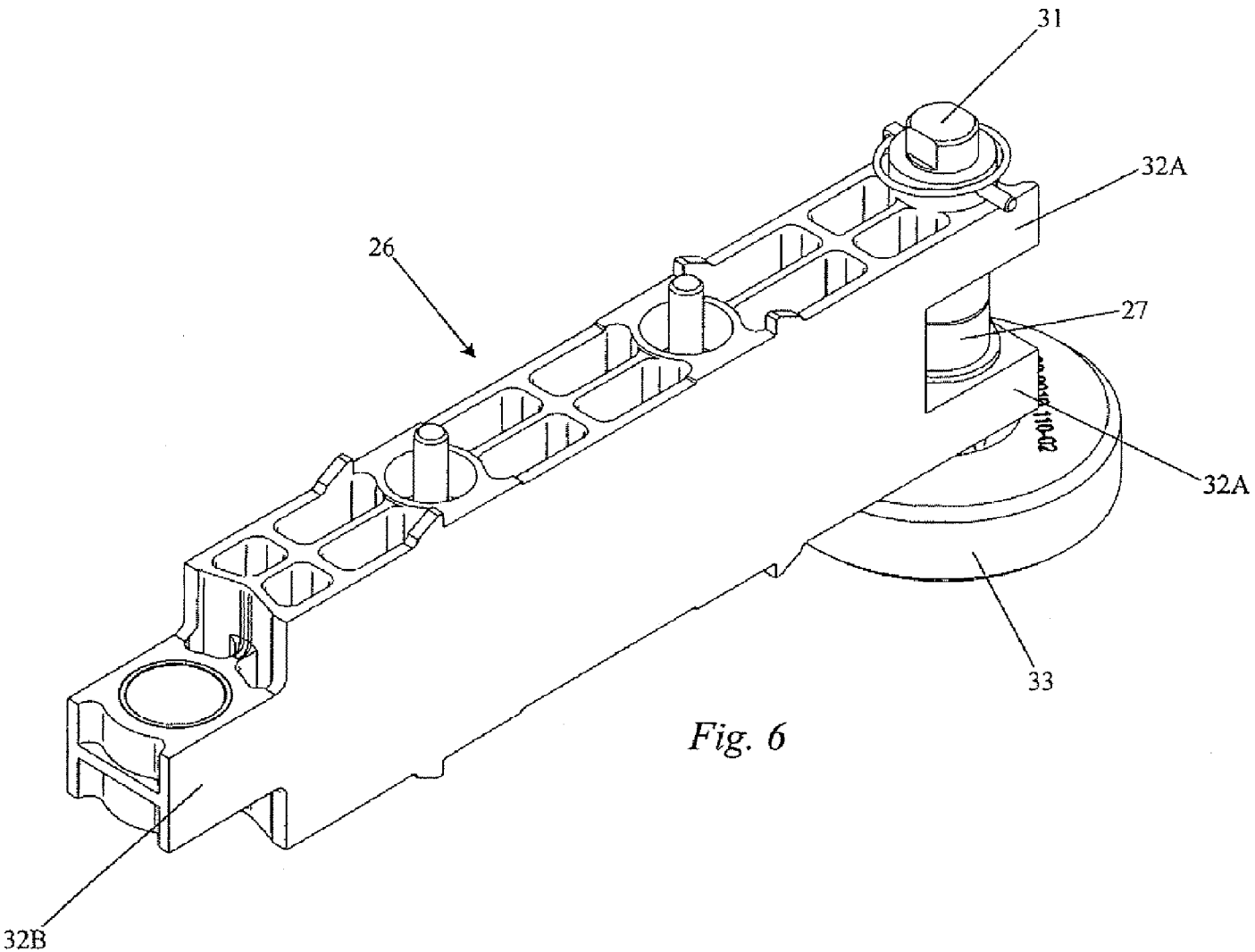
FIG. 6 is an enlarged perspective view of a link at the right end of FIG. 5.
Figure 7:
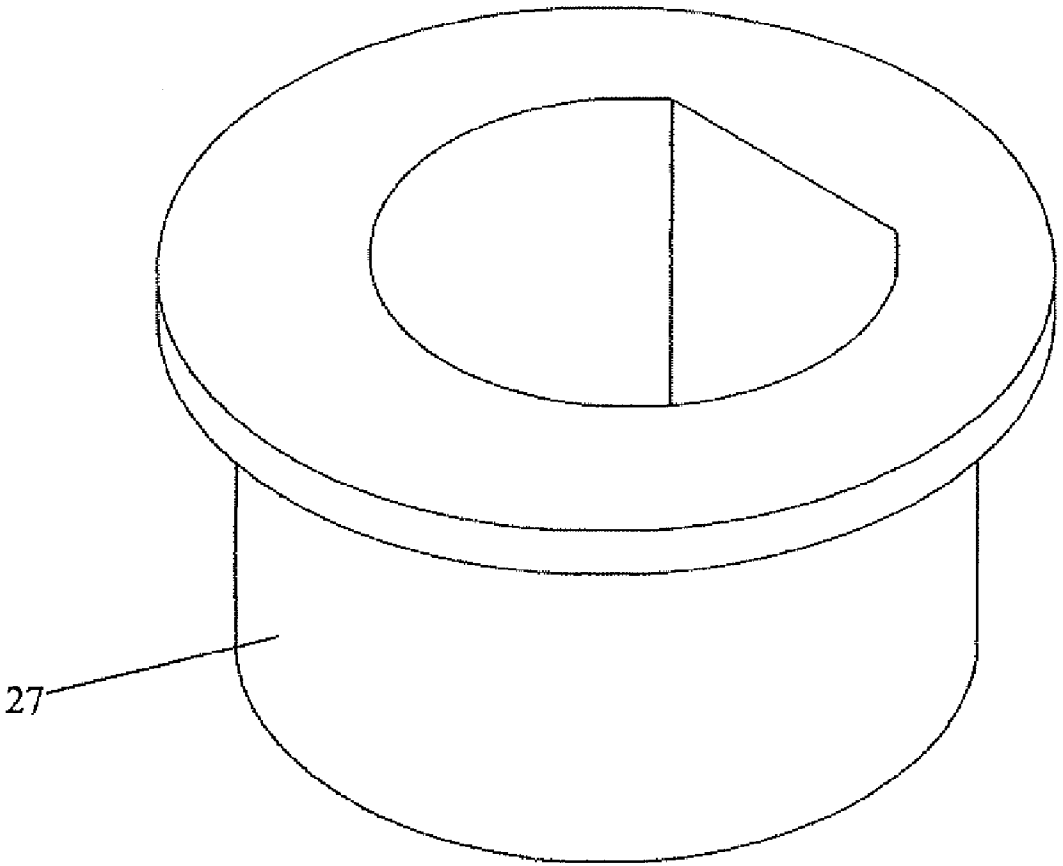
FIG. 7 a perspective view of a bushing shown in FIG. 6.
Figure 8:
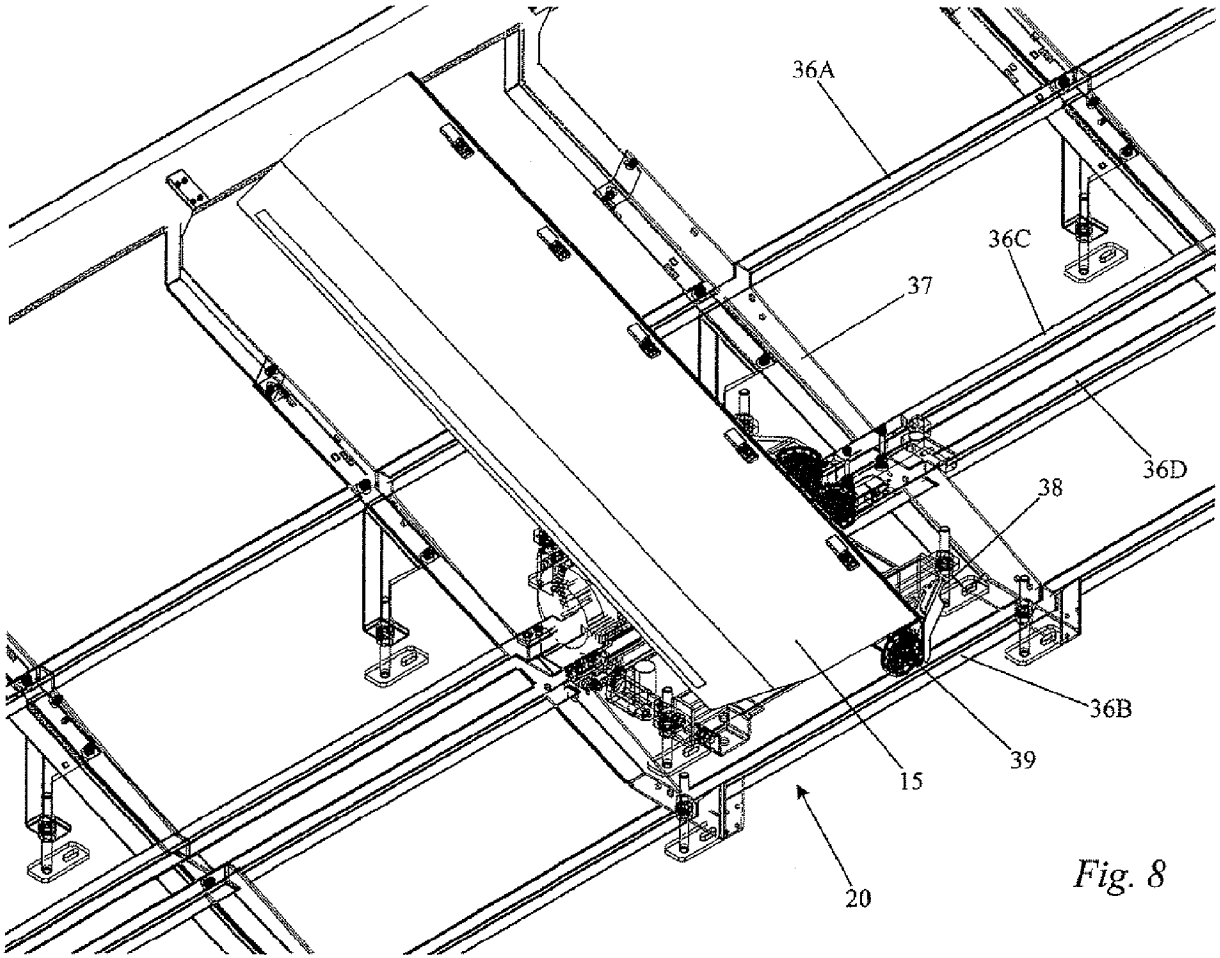
FIG. 8 is a partial perspective view, with most conveyor plates removed, of a carousel according to the invention.
Figure 9:
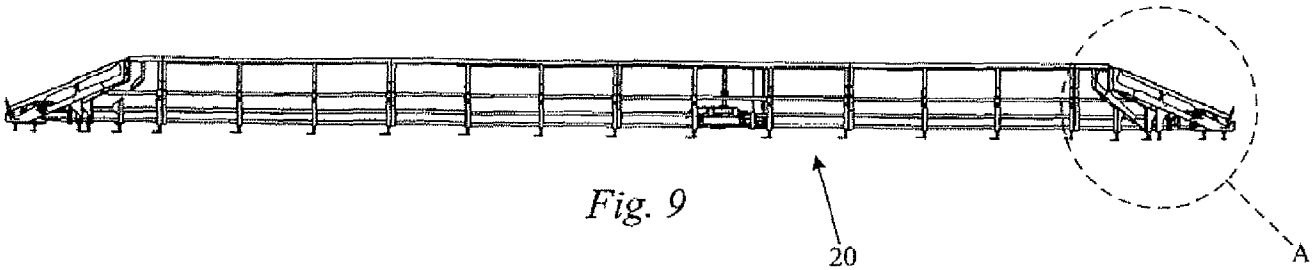
FIG. 9 is a cross sectional view through a carousel according to the invention.
Figure 10:
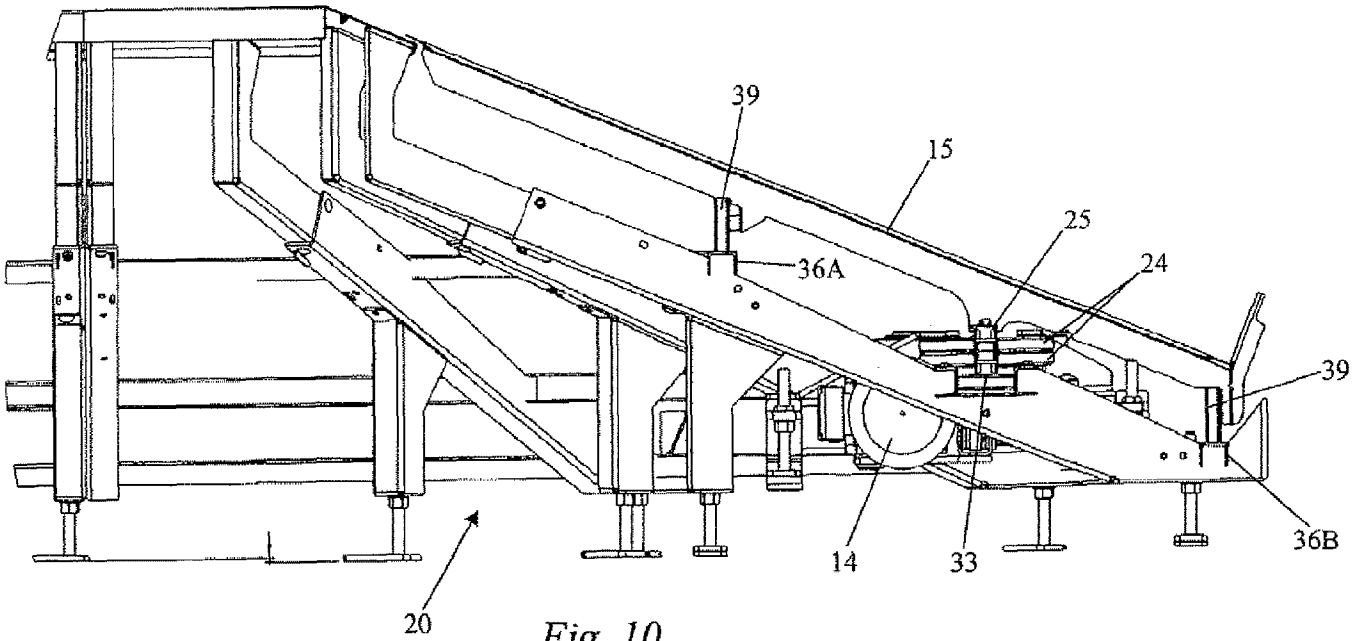
FIG. 10 is an enlarged view of Area A in FIG. 9.
Figure 11:
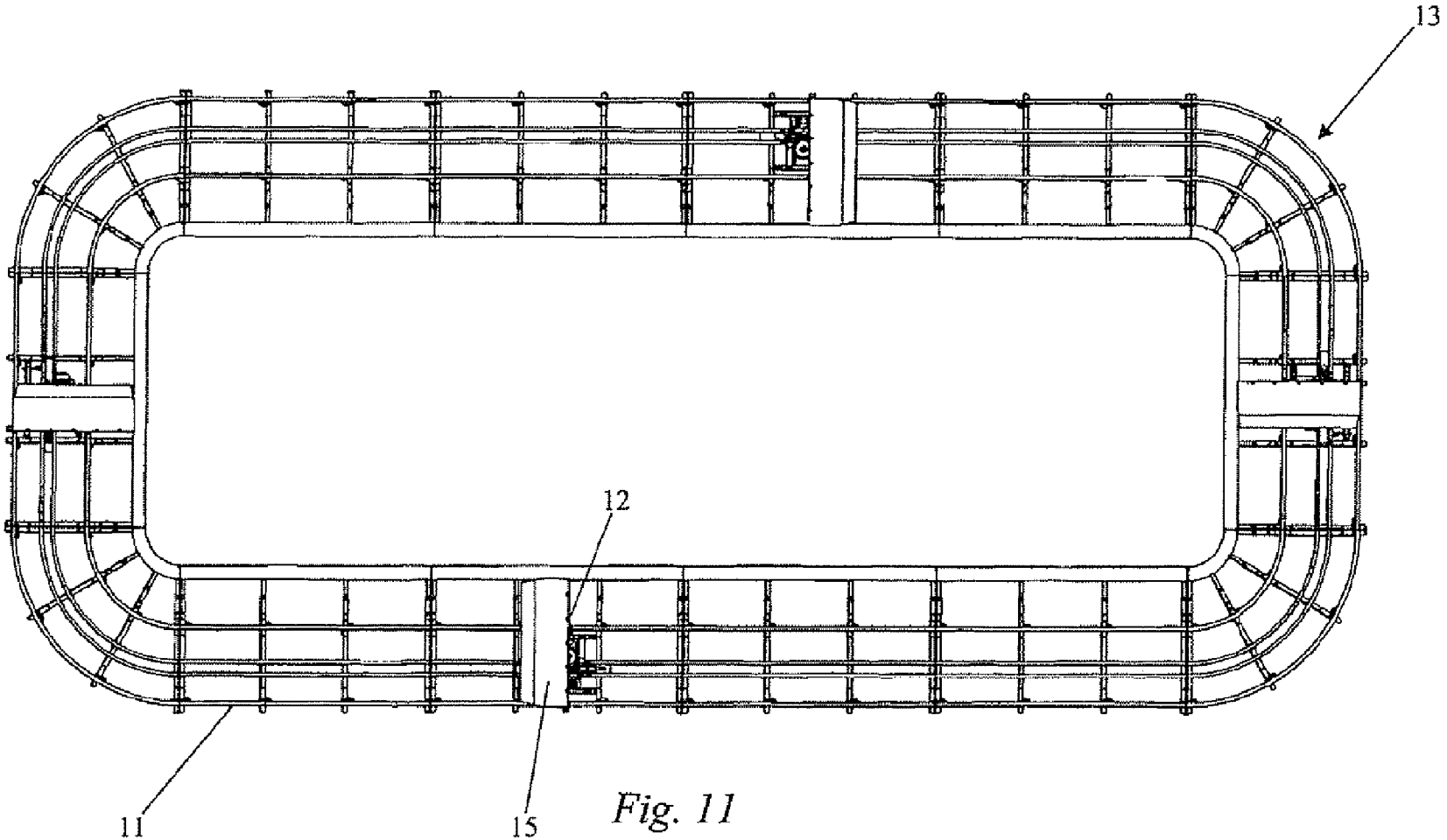
FIG. 11 is an overhead view of the conveyor frame shown in FIGS. 8 and 9.

Referring to FIGS. 1-2, a carousel system 10 according to one exemplary embodiment of the invention is a high capacity motor driven conveyor system designed for handling of baggage at either passenger claim areas or in baggage sorting areas. The moving sloped surface of the carousel 11 permits convenient display and maximum accumulation of baggage, as well as easy removal of baggage by passengers or baggage handling personnel. As shown in FIG. 1 the layout of a carousel 11 according to the invention is like that of known carousel units, wherein a series of overlapping plates (pallets) 15 are secured to an underlying endless chain that carries the pallets 15 along a endless (closed) path on a supporting frame 20.

Many airport carousels define an elongated, generally elliptical path. "Generally elliptical" as used in the present application refers to a conveyor path with two long sides connected by rounded ends. The long sides are usually straight and parallel and the rounded ends are often semicircular, or may include straight segments. Other known configurations include square or rectangular with rounded corners, circular, oval-shaped or the like and all can be implemented according to the present invention.

Each carousel 11 of the invention contains two or more friction drive assemblies 12 (depending on design requirements) to drive the carousel 11. According to a preferred form of the invention, all carousels 11 employ at least 2 drive modules 12 with the number depending on the length of the path: 0-60 ft=2 drives (1 required, 1 redundant), 61-120 ft=3 drives (2 required, 1 redundant), 121-180 ft=4 drives (3 required, 1 redundant), 181-240 ft=5 drives (4 required, 1 redundant), 241-300 ft=6 drives (5 required, 1 redundant).

FIG. 2 illustrates a schematic carousel system 10 according to the invention. Six 2 horsepower motors 14A-F are provided with associated disconnect mechanisms 13 which are switches that connect each motor 14 to its power supply. Motors 14 have associated manual control stations 16 mounted nearby, such as on a horizontal arm suspended over the conveyor path as shown. The interior space of the carousel frame 20 is sometimes enclosed by a housing and provides one or more electrical outlets 17 and a suitable place to mount an alarm 18 (flashing light and sound). For some carousel applications an induction mechanism 19 is provided that transports baggage onto the conveyor surface, and a photocell 21 can be used to detect baggage pieces on the carousel as they pass by and may for example be positioned to detect pieces that are too tall for downstream processing.

The system controller 22 that is connected to each of the motors 14A-14F, for example, by means of a transducer that generates a signal [the] *that* indicates the electrical current draw of that motor, which signal is used by the closed loop feedback scheme as described above. When the controller 22 needs to take a motor 14 out of service, a signal is generated to an actuator of the associated disconnect 13 to connect or disconnect the motor 14 from its power supply.

Other sensors can be used to monitor [conditions other than current load that can be used to implement closed loop feedback according to the invention to monitor] load, motor health, and jam conditions*, and these other sensors can be used to implement closed-loop feedback according to the invention*. For example, a main chain speed sensor can be used to determine the speed of the carousel relative to the motor output. Should the speed start to drop, additional motors would be engaged until the required speed is restored. Should the speed drop a greater than a preset deceleration rate, the system will assume a jam condition and stop. During start-up operations, all motors will engage. After 30 seconds, motors will sequentially disengage until a speed droop is observed or there is only a minimum (typically one) motor engaged.

Feedback for this control option is speed of the carousel sensed by a pulse generating wheel in direct contact with the surface of the main drive chain. Chain surface speed is converted into pulses whose period is observed by the logic control using conventional means. The observation of the period and difference in the period allows for direct calculation of the distance, speed, and acceleration of the carousel chain, which the main controller then compares to preset levels before taking an action such as described above.

Referring to FIGS. 3-11, the construction of airport carousels and similar conveyors are widely known in the art and implementation of a carousel system 10 according to the invention can vary considerably, e.g. the drive chain can be of the friction type as described below, could be sprocket driven, or could be driven by a series of linear induction motors (LIM's). It will be further understood that in most figures the external housing/enclosure of the carousel and all or part of the conveyor pallet surface are omitted so that underlying structures can be seen.

Drive units 12 in this example use a shaft-driven friction drive wheel 23 and opposing pressure rollers 24 on either side of the conveyor drive chain 25 to transfer drive motive forces to the recirculating endless chain 25 which is made of a series of pivotally connected chain links 26. The correct drive force is maintained to the chain 25 automatically with an acme-screw type linear actuator 28 and a position switch. Actuator 28 moves the assembly of drive wheel 23, its drive motor 14 (gearmotor or gear-reducer and motor) and supporting brackets towards or away from the drive chain 25. Chain tensioning is carried out using wrench-actuated eccentric bushings 27. Connector pins 31 are set through rectangular end projections 32A, 32B of adjacent links 26 with bushing 27 set inside of center projection 32B. Chain guide wheels 33 are mounted at the bottom ends of pins 31.

Standard modular assemblies, consisting of inner and outer tracks 36A, 36B and transoms 37, are bolted together to form the support structure (frame) 20 and guides for the chain 25 and pallets 15. Each pallet 15 has a support assembly 38 that is bolted to one or more of chain links 26 and a pair of wheels 39 that ride on tracks 36A, 36B. Guide wheels 33 on chain 25 roll around carousel 11 between two additional guide tracks 36C, 36D on conveyor frame 20. Chain 25 is tensioned by rotating pins 31 180 degrees on any number of chain links 26. Overlapping pallets 15 transport baggage or other items around the carousel 11. Each pallet 15 is clipped onto its pallet support assembly 38 by suitable fasteners such as high strength plastic keys on the pallet undersides.

Preferred specifications for the conveyor carousel 11 are:

- Minimum elevation: 16 inch—arrivals carousels, 28 inch—sort/make-up carousels
- Maximum static load: 200 pounds/foot
- Maximum live load: 125 pounds/foot
- Standard speed: 90 feet/minute (0.5 m/sec)
- Finish: 304 stainless steel, 303 stainless steel, or powder-coat painted hot rolled steel
- Wheels: 4 inch (100 mm) outer diameter polyurethane with sealed-for-life precision ball bearings.
- Travel direction: counterclockwise or clockwise
- Temperature range: 35° F. to 120° F.
- Track: Standard length modules between 9¾ inches (250 mm) and 117⅜ inches (2980 mm)

Curves are available in: 30°, 45°, or 90° modules, outside radius standard at 84 inches (2130 mm) 22.5° modules, inside radius standard at 256 inches (6500 mm). Chain: made using die cast aluminum links with maintenance free eccentric sintered bushings and hardened steel pins. The pallets are stainless steel or black plastic slats available in 1400 mm or f1 600 mm lengths.

- Bumper: High impact strength polymer with interlocked design to prevent pinch points
- Pallet Support Assembly: formed steel channel supported by low noise urethane wheels
- Drive type: Friction drive wheel imparts drive force to side of chain links
- Standard drive size: 2 HP gearmotors or motor and reducer combination
- Drive capacity in chain length: 60 feet at 125 lbs./ft of baggage load
- Low noise: <65 dBA.

Electro-mechanical linear actuators used in sortation carousels according to the invention will not normally be supplied to the claim carousel, i.e., the drive wheel 23 of an inactive drive unit can be allowed to remain in contact with the drive chain in some applications. The control scheme for a claim carousel need only accommodate the mechanical loss of any one mechanical drive assembly.

Sortation carousels according to the invention will have multiple control stations 16. Control stations 16 are typically located both on the perimeter of each sortation carousel 11 and within the eye (horseshoe, 180 degree curve) of each sortation carousel 11, adjacent to the unit drives 12. Each sortation carousel 11 has two modes of operation, normal and maintenance. The mode of operation is selected using a series of selector switches on the motor control panel (MCP) located within each sortation carousel, e.g. as part of controller 22. These switches may be presented as part of a touch screen display of the MCP.

There is a system level selection switch whereby the entire carousel system 10 (comprising the carousel 11 and its associated controls, however configured) is either in normal operations or maintenance operations. During normal operations, the carousel control switch must be in the "AUTO" position. The carousel may be under system level control during normal operations and subject to system and local RUN, STOP, and EMERGENCY STOP commands. For maintenance operations, the carousel control switch must be in the "MAINT" position. During maintenance operations, the system is restricted from system level control and is under local control only.

Each mechanical drive assembly 12 has a set of associated selector switches to control its operations. These selector switches allow the drive motors and linear actuator motors to be placed into NORMAL, and BYPASS modes. In normal mode, the start pushbuttons located around the perimeter of the sortation carousel are used to start the sortation carousel. Once started, all the associated subsystems are subject to auto-stopping. In starting the system, all drive motors are identified as NORMAL or BYPASS and all linear actuators are identified as NORMAL or BYPASS. Drive motors that are identified as NORMAL are engaged (if not engaged prior to the last shut-down event) by retracting the linear actuators for 5 seconds. This allows the actuator to achieve the desired drive pulley input force via spring deflection and a limit switch. All motors are soft-started.

During normal operations, all motors are engaged for 30 seconds after startup. The controller 22 (PLC) determines which operational motor has the lowest operational hours and labels it as the primary motor (internal code). The PLC monitors the current draw of all motors. Any motor running above its preset current draw limit is removed from system operation and a fault is registered, if all other motors are registering normal readings. Any current draw spike after the 30 second start-up period will be treated as a jam, and all motors will be shutdown.

Load-demand motor dropout is controlled as follows. During normal operation current monitoring, drive motors will be disengaged as the load allows. If the current draw for all drive motors is less than 75% of Full-Load Amps (FLA), then a drive motor is disengaged from the main chain interface by extending the linear actuator for 2.5 seconds and de-energizing the drive motor. The linear actuator is extended at the same time the drive motor is de-energized. A signal is sent to the system monitor. The drive motor disengaged is based on an algorithm which attempts to best distribute the main chain loading, i.e. to avoid long spans of drive chain not in engagement with a drive unit insofar as possible. The PLC will continue to disengage drive motor assemblies until the average current draw on the remaining drive motors is at or above 75% of FLA.

During normal operations current monitoring, drive motors will be engaged as the load demands. If the current for all drive motors is greater than 90% of FLA, then a drive motor is engaged from the main chain interface by energizing the drive motor and retracting the linear actuator for 5 seconds. This allows the actuator to achieve the desired drive pulley input force via spring deflection and a limit switch. A signal is sent to the system monitor and the first drive motor is restarted by the restart algorithm. The restart priorities are to obtain system balance and to engage the lowest run-time motors. The PLC will continue to engage drive motor assemblies until the average current draw on the remaining drive motors is at or below 90% of FLA. During normal operations, if the STOP command is given (internally or externally), the power is cut to all drive motors and actuators.

When a sortation carousel is in maintenance mode, all of the associated start pushbuttons are set to BYPASS mode, except for the START pushbutton located on the MCP. When this START pushbutton is depressed, the carousel system performs a normal start-up sequence with a delay and start-warning alarm. Regardless of mode, the sortation carousel can be stopped by any of the e-stops at the unit.

When the whole carousel is in maintenance mode, the carousel may only be started by the START pushbutton on the MCP. Pushing the START pushbutton will cause the alarm to sound and all available drive motors and linear actuators to engage normally. The PLC will continue to monitor current draw to prevent overload conditions, but will not load balance the drive motors as in normal operations. All the drive motor and linear actuator selector switches should be in the NORMAL position. Any drive motor selector switch in BYPASS [with] *will* cause both the drive motor and linear actuator to behave as BYPASS. Any linear actuator selector switch in BYPASS will cause the actuator to extend (if possible) and allow the drive motor to run without engaging the main chain.

To test an individual drive motor, all other drive motor selector switches should be set to BYPASS. The drive motor may be tested with main chain engagement by leaving the associated linear actuator selector switch in the NORMAL position. The PLC will disable the drive motor should there be excessive current draw (from a mechanical obstruction or overload condition). The drive motor may be tested without main chain engagement by placing the associated linear actuator selector switch in the BYPASS position.

To test the linear actuator, the main selector switch should be in MAINT. The MCP START pushbutton does not need to be depressed to operate the linear actuators. When the linear actuator selector switch is in NORMAL, the actuator should be retracted due to the spring deflection that breaks the contacts on the retract limit switch. When the actuator selector switch is in DISABLE, the actuator should extend for a set period of time, and may or may not reach its mechanical over-travel clutch.

Although several embodiments of the present invention have been described in the foregoing detailed description and illustrated in the accompanying drawings, it will be understood by those skilled in the art that the invention is not limited to the embodiments disclosed but is capable of numerous rearrangements, substitutions and modifications without departing from the spirit of the invention. A controller for purposes of the invention may be a single control unit that operates the various components or two or more controllers that work together. This and other modifications are within the scope of the invention as expressed in the appended claims.

The invention claimed is:

1. A carousel conveyor system, comprising:

an endless conveyor support frame including one or more endless support rails disposed along a generally elliptical carousel path;

a friction drive chain disposed on the conveyor support frame for movement along the carousel path;

a pallet assembly including a series of overlapped pallets configured to fit over an upper surface of the conveyor support frame, including a pallet support assembly including wheels that support the pallets on the rails of the conveyor support frame; and connectors securing the pallet assembly to the drive chain for movement in unison therewith;

at least two friction drive units each including an electric motor, electrical disconnects for connecting and [disconnect] *disconnecting* each motor from a source of electrical power, and a friction drive wheel positioned for driving contact with the drive chain, which drive units are located at spaced apart positions on the conveyor support frame along the carousel path;

a controller programmed with control logic for operation of the drive units and connected to receive signals that indicate electrical load on the motor of that drive unit during carousel operation and also connected to the disconnects in a manner that is effective to turn the associated motor on or off in response to a signal from the controller, wherein the control logic takes an action in response to feedback comprising the signals from each drive unit that indicate electrical current being drawn by the motors.

2. The system of claim 1, wherein the control logic takes action in response to feedback comprising signals from each drive unit that indicate electrical current being drawn by the motors.

3. The [apparatus] *system* of claim 1, wherein the action in response to feedback comprises turning one of the drive unit motors on or off.

4. The [apparatus] *system* of claim 1, wherein the action in response to feedback comprises turning one of the drive unit motors on in response to one or more feedback signals indicating an increase in load on the carousel requiring additional drive force application to the drive chain.

5. The [apparatus] *system* of claim 1, wherein the action in response to feedback comprises turning one of the drive unit motors off in response to one or more feedback signals indicating a decrease in load on the carousel requiring less drive force application to the drive chain.

6. The [apparatus] *system* of claim 1, wherein the action in response to feedback comprises turning all of the drive unit motors off in response to one or more feedback signals indicating a jam condition has occurred on the carousel.

7. The [apparatus] *system* of claim 1, wherein at least one of the drive units is redundant in that not all of the drive units need to run at the same time in order for the carousel conveyor to operate at a predetermined load.

*8. A carousel conveyor system, comprising:*

*an endless conveyor support frame including one or more endless support rails disposed along a carousel path;*

*a drive chain disposed on the conveyor support frame for movement along the carousel path;*

*a pallet assembly including a series of pallets configured to fit over an upper surface of the conveyor support frame, including a pallet support assembly including wheels that support the pallets on the rails of the conveyor support frame; and connectors securing the pallet assembly to the drive chain for movement in unison therewith;*

*at least two drive units each including an electric motor, electrical disconnects for connecting and disconnecting each motor from a source of electrical power, and configured to drive the drive chain, which drive units are located at spaced apart positions on the conveyor support frame along the carousel path;*

*a controller programmed with control logic for operation of the drive units and connected to receive signals that indicate electrical load on the motor of that drive unit during carousel operation and also connected to the disconnects in a manner that is effective to turn the associated motor on or off in response to a signal from the controller, wherein the control logic takes an action*

*in response to feedback comprising the signals from each drive unit that indicate electrical current being drawn by the motors.*

*9. The system of claim 8, wherein the control logic takes action in response to feedback comprising signals from each drive unit that indicate electrical current being drawn by the motors.*

*10. The system of claim 8, wherein the action in response to feedback comprises turning one of the drive unit motors on or off.*

*11. The system of claim 8, wherein the action in response to feedback comprises turning one of the drive unit motors on in response to one or more feedback signals indicating an increase in load on the carousel requiring additional drive force application to the drive chain.*

*12. The system of claim 8, wherein the action in response to feedback comprises turning one of the drive unit motors off in response to one or more feedback signals indicating a decrease in load on the carousel requiring less drive force application to the drive chain.*

*13. The system of claim 8, wherein the action in response to feedback comprises turning all of the drive unit motors off in response to one or more feedback signals indicating a jam condition has occurred on the carousel.*

*14. The system of claim 8, wherein at least one of the drive units is redundant in that not all of the drive units need to run at the same time in order for the carousel conveyor to operate at a predetermined load.*

*15. The system of claim 8, wherein the at least two drive units are each configured to drive the drive chain using a friction drive wheel.*

*16. The system of claim 8, wherein the at least two drive units are each configured to drive the drive chain using a sprocket.*

*17. The system of claim 8, wherein the at least two drive units are each configured to drive the drive chain using a linear induction motor.*

*18. The system of claim 8, wherein the conveyor path includes rounded portions and straight portions.*

* * * * *